United States Patent
Kurihara et al.

(10) Patent No.: US 7,687,570 B2
(45) Date of Patent: Mar. 30, 2010

(54) THERMOSETTING RESIN MATERIAL

(75) Inventors: Shou Kurihara, Tokyo (JP); Hiroshi Idei, Tokyo (JP); Yoshihiro Aoyagi, Tokyo (JP); Naeko Okumura, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 102 days.

(21) Appl. No.: 12/213,528

(22) Filed: Jun. 20, 2008

(65) Prior Publication Data

US 2008/0319124 A1  Dec. 25, 2008

(30) Foreign Application Priority Data

Jun. 22, 2007  (JP)  ............ P.2007-164725

(51) Int. Cl.
*C08G 65/40*  (2006.01)
(52) U.S. Cl. ............ 524/541; 524/540; 528/212; 528/214; 528/219
(58) Field of Classification Search ........... 524/540, 524/541; 528/212, 214, 219
See application file for complete search history.

(56) References Cited

U.S. PATENT DOCUMENTS 6,323,270 B1 * 11/2001 Ishida ............ 524/445

FOREIGN PATENT DOCUMENTS

| EP | 0 443 555 A1 | 8/1991 |
| EP | 0 789 056 A2 | 8/1997 |
| JP | 8-145098 | 6/1996 |
| JP | 9-272786 | 10/1997 |

OTHER PUBLICATIONS

European Search Report for European Application No. EP 08 01 1202, dated May 8, 2009.

* cited by examiner

*Primary Examiner*—Peter Szekely
(74) *Attorney, Agent, or Firm*—Finnegan, Henderson, Farabow, Garrett & Dunner, L.L.P.

(57) ABSTRACT

A thermosetting resin material is provided with: (A) a thermosetting resin having a dihydrobenzoxazine ring; and (B) a condensed polycyclic aromatic hydrocarbon resin is described.

5 Claims, No Drawings

THERMOSETTING RESIN MATERIAL

This application claims foreign priority from Japanese Patent Application No. 2007-164725 filed on Jun. 22, 2007, the entire contents of which are hereby incorporated by reference.

BACKGROUND OF THE INVENTION

1. Field of the Invention

The present invention relates to a thermosetting resin material. The thermosetting resin material of the invention is preferably used for various uses, for example, friction materials, molding materials, machine parts, structural members, structural adhesives, and the like.

2. Background Art

Thermosetting resins having a dihydrobenzoxazine ring are excellent in heat resisting decomposition characteristic in both atmospheres of an oxidizing atmosphere (for example, in atmospheric air) and an inert atmosphere (for example, in nitrogen gas) and have an advantage of not generating by-products at thermosetting time, but have a drawback such that thermosetting takes time. Therefore, shortening of thermosetting time has been tried by the addition of thermosetting resins such as phenol resins and polyimide resins, but physical properties are liable to be influenced by the thermal decomposition characteristic of the resins to be added.

For example, a thermosetting resin composition containing a thermosetting resin having a dihydrobenzoxazine ring and a novolak type phenol resin is disclosed in Patent Document 1. However, heat resisting decomposition characteristic of novolak type phenol resin is excellent in an inert atmosphere but inferior in an oxidizing atmosphere, so that the thermosetting resin composition is insufficient in heat resisting decomposition characteristic in an oxidizing atmosphere.

On the other hand, polyimide resin is excellent in heat resisting decomposition characteristic in an oxidizing atmosphere, but inferior in an inert atmosphere, so that a thermosetting resin composition containing a thermosetting resin having a dihydrobenzoxazine ring and a polyimide resin has a drawback such that heat resisting decomposition characteristic in an inert atmosphere is insufficient.

As resins excellent in heat resisting decomposition characteristic in both atmospheres of an oxidizing atmosphere and an inert atmosphere, condensed polycyclic aromatic hydrocarbon resins (generally called as COPNA resins) are known. For example, a thermosetting resin obtained by introduction of a phenolic nucleus into the molecule of a condensed polycyclic aromatic hydrocarbon resin is disclosed in Patent Document 2, but hexamethylenetetramine (hexamine) and an acid catalyst are necessary for thermosetting of the thermosetting resin, and a by-product is generated at the time of thermosetting, so that there are problems in the points of environmental aspect and stability of quality.

Further, when an acid catalyst is used as a setting agent, problems arise such as occurrences of corrosion and rust of a molding apparatus of the thermosetting resin.

[Patent Document 1] JP-A-09-272786
[Patent Document 2] JP-A-08-145098

SUMMARY OF THE INVENTION

One or more embodiments of the invention provide a thermosetting resin material containing a thermosetting resin having a dihydrobenzoxazine ring, excellent in a heat resisting decomposition characteristic in both atmospheres of an oxidizing atmosphere and an inert atmosphere, capable of shortening the thermosetting time of the thermosetting resin, and not generating by-products at the time of thermosetting.

According to a first aspect of the invention, a thermosetting resin material is provided with: (A) a thermosetting resin having a dihydrobenzoxazine ring; and (B) a condensed polycyclic aromatic hydrocarbon resin.

According to a second aspect of the invention, in the thermosetting resin material of the first aspect, the condensed polycyclic aromatic hydrocarbon resin of component (B) may comprise a thermosetting resin having a phenolic nucleus in the molecule.

According to a third aspect of the invention, in the thermosetting resin material of the first or the second aspect, the ratio of contents of component (A) and component (B) may be from 80/20 to 50/50 in a mass ratio.

According to a fourth aspect of the invention, the thermosetting resin material of any one of the first to third aspects may further be provided with (C) a filler treated with an organic compound.

According to a fifth aspect of the invention, in the thermosetting resin material of the fourth aspect, the filler treated with an organic compound of component (C) may be mixed in the reaction process at the time of manufacture of the thermosetting resin of component (A).

In accordance with the aspects of the invention, a thermosetting resin material having an excellent heat resisting decomposition characteristic in both atmospheres of an oxidizing atmosphere and an inert atmosphere, capable of shortening the setting time of a thermosetting resin having a dihydrobenzoxazine ring, and not generating by-products at the time of thermosetting, so that preferably used for various uses, for example, friction materials, molding materials, machine parts, structural members, structural adhesives, and the like can be provided.

Other aspects and advantages of the invention will be apparent from the following description, the drawings and the claims.

DETAILED DESCRIPTION OF THE EXEMPLARY EMBODIMENTS

In an exemplary embodiment of the invention, a thermosetting resin material contains (A) a thermosetting resin having a dihydrobenzoxazine ring (hereinafter sometimes referred to as a polybenzoxazine resin); and (B) a condensed polycyclic aromatic hydrocarbon resin.

[(A) Polybenzoxazine Resin]

In the thermosetting resin material, a polybenzoxazine resin used as component (A) may be manufactured by condensation reaction of a compound having a phenolic hydroxyl group, primary amines, and formaldehydes.

As the compound having a phenolichydroxyl group, monohydric, or dihydric or higher polyhydric phenols having a hydrogen atom at least either one ortho position of the hydroxyl group on an aromatic ring may be used, specifically monohydric phenols, such as phenol, o-cresol, m-cresol, p-cresol, xylenol, p-t-butylphenol, α-naphthol, β-naphthol, and p-phenylphenol; dihydric phenols, such as catechol, resorcinol, 4,4'-dihydroxydiphenylmethane (bisphenol F), and 2,2-bis(4-hydroxyphenyl)propane (bisphenol A); and trihydric or higher polyhydric phenols such as a trisphenol compound, a tetraphenol compound, and a phenol resin may be exemplified. Of these compounds, bisphenol A is preferred from the viewpoint of the performances of the polybenzoxazine resin to be obtained.

On the other hand, there are aliphatic amines and aromatic amines as the primary amines, but when aliphatic amines are used, the polybenzoxazine resin to be obtained is inferior in heat resistance, and aromatic amines are preferred. As the aromatic amines, e.g., aniline, toluidine, xylidine and anisidine may be exemplified.

As the formaldehydes, formalin, paraformaldehyde and trioxan may be exemplified.

The condensation reaction is preferably performed in the proportion of primary amines of from 0.5 to 1.0 mol and the like, and preferably from 0.6 to 1.0 mol, per mol of all the phenolic hydroxyl groups, and formaldehyde of preferably 2 mols or more per mol of the primary amines.

The reaction may be carried out by heating treatment of the compound having a phenolic hydroxyl group, primary amines and formaldehydes in an appropriate solvent, e.g., water, lower alcohol such as methanol or ethanol, or ketones such as methyl ethyl ketone or methyl isobutyl ketone at temperature of from 50 to 120° C. or so. A desired polybenzoxazine resin may be obtained by solid-liquid separation and drying after the reaction, or by distilling the solvent under reduced pressure.

When bisphenol A as the compound having a phenolic hydroxyl group, and aniline as the primary amine are used respectively, a polybenzoxazine resin represented by the following formula (I) may be manufactured.

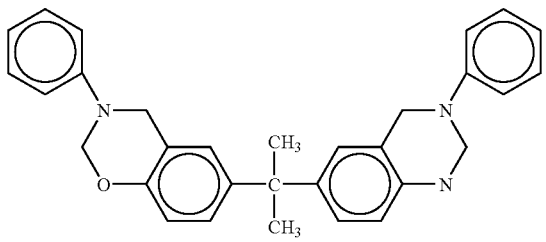

<Formula (I)>

By heating at temperature of 140 to 250° C. or so, the dihydrobenzoxazine ring of the polybenzoxazine resin opens to be self-crosslinked, or, when a crosslinking compound is present, the ring is set by crosslinked the crosslinking compound at the same time with self-crosslinking. Accordingly, volatile by-products do not occur at the time of setting.

In the thermosetting resin material of the embodiment, the polybenzoxazine resin may be used by one kind alone, or two or more kinds may be used in combination as component (A)

[(B) Condensed Polycyclic Aromatic Hydrocarbon Resin]

In the thermosetting resin material, condensed polycyclic aromatic hydrocarbon resins (generally called as COPNA resins) that are used as component (B) are not especially restricted and conventionally known COPNA resins may be used. Specifically, condensed polycyclic aromatic hydrocarbon resins obtained by the reaction of condensed polycyclic aromatic hydrocarbon such as naphthalene, acenaphthene, phenanthrene, anthracene, pyrene, or alkyl substitution products thereof, an aromatic hydrocarbon compound substituted with at least two hydroxymethyl groups or halomethyl groups as a crosslinking agent, preferably a hydroxymethyl compound such as dihydroxymethylbenzene (xylylene glycol), dihydroxymethylxylene, trihydroxymethylbenzene, or dihydroxymethylnaphthalene, in the presence of an acid catalyst, and thermosetting resins obtained by introducing a phenolic nucleus into the molecules of these condensed polycyclic aromatic hydrocarbon resins may be exemplified. A phenolic nucleus may be introduced by the reaction of a mixture obtained by blending the condensed polycyclicaromatic hydrocarbon and an aromatic hydroxy compound such as phenol, naphthol or resorcinol with the crosslinking agent in the presence of an acid catalyst.

COPNA resins to which a phenolic nucleus is introduced are preferred to COPNA resins to which a phenolic nucleus is not introduced. The reason for this is that the COPNA resins to which a phenolic nucleus is introduced are capable of shortening the setting time of a polybenzoxazine resin used as component (A) and, at the same time, function as crosslinking compounds to crosslink the COPNA resins to be cured at the time of opening and self-crosslinking of the dihydrobenzoxazine ring of the polybenzoxazine resin.

In the embodiment, the COPNA resin may be used by one kind alone, or two or more kinds of COPNA resins may be used in combination as component (B). The proportion of the content of the polybenzoxazine resin of component (A) and the COPNA resin of component (B) is preferably 80/20 to 50/50 in a mass ratio, and more preferably 75/25 to 60/40, from the viewpoint of the heat resisting decomposition characteristics in both atmospheres of an oxidizing atmosphere and an inert atmosphere, and shortening of setting time of the polybenzoxazine resin of component (A).

The COPNA resins are commercially available from Air Water Inc. under the trade names of "QH series", "HE510 series" (a phenolic nucleus is introduced), "HE100 series" (a phenolic nucleus is introduced), and "HE900 series" (a phenolic nucleus is introduced).

[(C) A Filler Treated with an Organic Compound]

The thermosetting resin material may further contain a filler treated with an organic compound as component (C) together with component (A) and component (B).

As the filler treated with an organic compound, products treated with an organic compound such as calcium carbonate, barium sulfate, magnesia, alumina, zirconia, silica, aluminum powder, copper powder, zinc powder, graphite, molybdenum disulfide, and antimony sulfide, including swelling clay minerals may be exemplified. By the treatment with an organic compound, the fillers are given good dispersibility into a thermosetting resin material.

(Treatment of a Filler Comprising Swelling Clay Mineral with an Organic Compound)

Swelling clay mineral has a laminar structure, and an interlaminar compound is formed by the treatment with an organic compound and, at the same time, the distance between layers is widened, and layer separation is liable to occur, as a result the dispersibility into the thermosetting resin material of the embodiment is improved.

As the swelling clay minerals to be treated with an organic compound, e.g., smectites series clay minerals such as montmorillonite, saponite, beidellite, nontronite, hectorite, and stevensite, vermiculite and halloysite are exemplified, and these minerals may be natural products or may be synthesized products. Of these minerals, montmorillonite is especially preferred from the viewpoints that treatment is easy and the effect of improvement of reinforcement as a filler is great.

As the organic compounds for use in the treatment of these swelling clay minerals, amines and quaternary ammonium salts are exemplified. The examples of the amines that may be used include aliphatic amines and aromatic amines having from 1 to 18 carbon atoms. The specific examples of the aliphatic amines include hydrochloride and bromate of diethylamine, amylamine, dodecylamine, stearylamine, and didodecylmethylamine, and the specific examples of the aromatic amines include aniline, toluidine, xylidine, and phenylenediamine. Of these amines, aniline is especially preferred. On the other hand, as the quaternary ammonium salts, e.g., dimethyldioctadecylammonium chloride, oleyl-bis(2-hydroxyethyl)methylammonium chloride may be preferably exemplified.

(Treatment of Fillers Other than Swelling Clay Mineral with an Organic Compound)

It is preferred that the treatment of fillers other than swelling clay minerals, e.g., calcium carbonate, barium sulfate, magnesia, alumina, zirconia, silica, aluminum powder, copper powder, zinc powder, graphite, molybdenum disulfide, and antimony sulfide with an organic compound be carried out by using, as the organic compounds, aliphatic or aromatic primary amines having from 10 to 35 carbon atoms or a silane coupling agent having a primary amine group on the terminals.

As the aliphatic or aromatic primary amines, e.g., n-dodecylamine, n-hexadecylamine, n-octadecylamine, n-nonadecylamine, p-tert-butylaniline, p-octylaniline, and p-dodecylaniline are exemplified, and as the silane coupling agents, e.g., 3-aminopropyltrimethoxysilane and 3-aminopropyltriethoxysilane are exemplified. Of these organic compounds, dodecylamine is especially preferred.

The treating methods of fillers with the organic compounds are not especially restricted, and a method of treatment with the organic compounds in the state of melted liquids as they are, or a method of dissolving the organic compounds in an appropriate organic solvent and treating in the state of solutions may be used.

In the thermosetting resin material, a filler thus-treated with an organic compound may be contained by one kind alone, or two or more kinds may be contained as component (C). The kind and amount of fillers to be contained may be arbitrarily selected according to the use of the thermosetting resin material.

Methods of the addition of a filler treated with an organic compound as component (C) to the thermosetting resin material are not especially restricted, and a method of dissolving and kneading component (C) with component (A) and other arbitrary components may be used, but from the view point of dispersibility, it is preferred for component (C) to be added in the manufacturing process of a polybenzoxazine resin of component (A).

Specifically, a polybenzoxazine resin is manufactured by condensation reaction of a compound having a phenolic hydroxyl group, primary amines, and formaldehydes in an appropriate solvent in the presence of a filler treated with an organic compound as component (C), by which the filler excellent in dispersibility treated with an organic compound is to be contained in the thermosetting resin material as component (C).

[Arbitrary Components Other than a Filler]

As optional components other than the filler of component (C), the thermosetting resin material of the embodiment may optionally contain, according to the use, at least one kind of component selected from various kinds of fibrous materials, cashew dust and rubber dust.

As the fibrous materials, any of organic fibers and inorganic fibers may be used. As the organic fibers, highly strong aromatic polyamide fibers (Aramid fiber; trade name "Kevlar", manufactured by Du Pont-Toray Co., Ltd.), flame resisting acryl fibers, polyimide fibers, polyacrylate fibers, and polyester fibers may be exemplified. On the other hand, as the inorganic fibers, inorganic whiskers, e.g., potassium titanate whiskers and silicon carbide whiskers; glass fibers; carbon fibers; mineral fibers, e.g., wollastonite, sepiolite, attapulgite, halloysite, mordenite, and rock fiber; ceramic fibers, e.g., alumina silica fiber; and metal fibers, e.g., aluminum fiber, stainless steel fiber, copper fiber, brass fiber, and nickel fiber may be exemplified. These fibrous materials may be used by one kind alone, or two or more materials may be used in combination.

[A Thermosetting Resin Material]

The thus-manufactured thermosetting resin material of the embodiment is excellent in heat resisting decomposition characteristic in both atmospheres of an oxidizing atmosphere and an inert atmosphere, capable of shortening the thermosetting time of the polybenzoxazine resin, and is not accompanied by generation of by-products at the time of thermosetting. Accordingly, the thermosetting resin material has no problem in the aspects of environment and stability of quality, and may be preferably used for various uses, for example, friction materials, molding materials, machine parts, structural members, structural adhesives, and the like.

For manufacturing a molded product of the thermosetting resin material, for example, the thermosetting resin material is filled in a mold, heated and compression molded on the condition of the temperature of about 130 to 190° C. and the pressure of about 10 to 100 MPa for 5 to 35 minutes or so, and if necessary, after curing treatment is performed at the temperature of about 160 to 270° C. for 1 to 10 hours or so, whereby a desired molded product can be manufactured.

EXAMPLE

The embodiment will be described in further detail with reference to examples, but the invention is by no means restricted thereto.

The heat resisting decomposition characteristic and curing characteristic of the thermosetting resin material obtained in each example are evaluated according to the following methods.

(1) A Heat Resisting Decomposition Characteristic [TG-DTA (Thermogravimetry-Differential Thermal Analysis) Measurement]

A thermosetting resin material of a sample is thermoset in an oven at 180° C. for 1 hour, and then subjected to after curing at 250° C. for 3 hours. The obtained resin after curing is pulverized with a sample mill to an average particle size of 50 μm and recovered to obtain a sample for TG-DTA measurement.

The measurement is performed on the condition of sample mass: 10 mg, temperature increasing rate: 10° C./min, measuring temperature: 25 to 1,000° C., and measuring atmospheres: in atmospheric air and nitrogen gas. Mass retention is compared at 600° C. in atmospheric air and 900° C. in nitrogen gas.

(2) A Curing Characteristic (Gelling Time Measurement)

Measurement is performed in conformity with JIS K6910 7.11 D method (a flat plate method) at temperature of the hot plate of 180±1° C. The shorter the gelling time, the better is the curing characteristic.

Manufacture Example 1

Manufacture of a Polybenzoxazine Resin

Bisphenol A (300 g), aniline (242 g), paraformaldehyde (168 g), and methyl ethyl ketone (MEK) (300 g) are weighed and put in a four-neck flask, and condensation reaction is performed by stirring with heating at 40° C. for 1 hour and at 50° C. for 1 hour, followed by stirring while refluxing at 80° C. for 4 hours. After the condensation reaction, the solvent is removed under reduced pressure at 0.06 MPa for 1 hour to thereby obtain 600 g of a polybenzoxazine resin.

Example 1

The polybenzoxazine resin obtained in Manufacture Example 1 (70 g) and 30 g of a condensed polycyclic aromatic hydrocarbon resin [SK resin, SKR-H-17 to which phenolic nuclei are introduced (trade name, manufactured by Air Water Inc.)] are ground at the same time with a hammer mill and mixed to prepare thermosetting resin material A.

Example 2

The polybenzoxazine resin obtained in Manufacture Example 1 (70 g), 30 g of SK resin, SKR-H-17, and MEK are weighed and put in a flask, stirred while refluxing at 80° C. for 4 hours, and then the solvent is removed under reduced pressure at 0.06 MPa for 1 hour to prepare thermosetting resin material B.

Example 3

The polybenzoxazine resin obtained in Manufacture Example 1 (70 g) and 30 g of SK resin, SKR-H-17 are roughly ground at the same time with a hand mill and mixed. The obtained roughly ground mixture is melt-kneaded at kneading temperature of 105° C. with a biaxial kneader, and ground after cooling with a hammer mill to prepare thermosetting resin material C.

Comparative Example 1

The polybenzoxazine resin obtained in Manufacture Example 1 is ground with a hammer mill to prepare thermosetting resin material D.

Comparative Example 2

(1) Manufacture of a Phenol Resin
Phenol (500 g), 324 g of formalin (a 37 mass % aqueous solution), and 1.8 g of oxalic acid dihydrate are put in a four-neck flask and subjected to polycondensation reaction by stirring while refluxing at 100° C. for 8 hours. After the reaction, the reaction product is dehydrated under reduced pressure at 0.02 MPa for 3 hours to recover a phenol resin.

(2) Mixture of Polybenzoxazine Resin and Phenol Resin
The polybenzoxazine resin obtained in Manufacture Example 1 (70 g) and 30 g of the phenol resin obtained in the above (1) are ground at the same time with a hammer mill and mixed to prepare thermosetting resin material E.

Comparative Example 3

The polybenzoxazine resin obtained in Manufacture Example 1 (70 g) and 30 g of a thermosetting polyimide resin (trade name "KIR-30", manufactured by KYOCERA Chemical Corporation) are ground at the same time with a hammer mill and mixed to prepare thermosetting resin material F.

The heat resisting decomposition characteristic and the curing characteristic of thermosetting resin materials A to F prepared in Examples 1 to 3 and Comparative Examples 1 to 3 are evaluated. The results obtained are shown in Table 1 below.

TABLE 1

| Example No. | Thermosetting Resin Material | Heat Resisting Characteristic TG-DTA Mass Retention (%) | | Curing Characteristic Gelling Time (sec) 180° C. |
|---|---|---|---|---|
| | | In Atmospheric Air 600° C. | In Nitrogen gas 900° C. | |
| Example 1 | A | 34 | 65 | 122 |
| Example 2 | B | 37 | 67 | 108 |
| Example 3 | C | 33 | 65 | 118 |
| Comparative Example 1 | D | 26 | 55 | 1,700 |
| Comparative Example 2 | E | 16 | 63 | 92 |
| Comparative Example 3 | F | 35 | 48 | 125 |

Thermosetting resin material E in Comparative Example 2 (mixture of a polybenzoxazine resin and a phenol resin) is low in the mass retention in atmospheric air, and thermosetting resin material F in Comparative Example 3 (mixture of a polybenzoxazine resin and a polyimide resin) is low in the mass retention in nitrogen gas, while thermosetting resin materials A to C in Examples 1 to 3 (mixture of a polybenzoxazine resin and a condensed polycyclic aromatic hydrocarbon resin) are all high in the mass retention in both of atmospheric air and nitrogen gas, excellent in heat resisting decomposition characteristic, the gelling time is shorter as compared with thermosetting resin material D in Comparative Example 1 (a polybenzoxazine resin alone), and curing characteristic is also good.

The thermosetting resin material of the embodiment containing a polybenzoxazine resin and a condensed polycyclic aromatic hydrocarbon resin is excellent in heat resisting decomposition characteristic in both atmospheres of an oxidizing atmosphere and an inert atmosphere, is capable of shortening of curing time of the polybenzoxazine resin, is not accompanied by generation of by-products at the time of thermosetting, therefore there are no problems in the aspect of environment and stability of quality, and can be preferably used for various uses, for example, friction materials, molding materials, machine parts, structural members, structural adhesives, and the like.

While description has been made in connection with specific embodiment and examples of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A thermosetting resin material comprising:
   (A) a thermosetting resin having a dihydrobenzoxazine ring; and
   (B) a condensed polycyclic aromatic hydrocarbon resin.

2. The thermosetting resin material according to claim 1, wherein the condensed polycyclic aromatic hydrocarbon resin of component (B) comprises a thermosetting resin having a phenolic nucleus in the molecule.

3. The thermosetting resin material according to claim 1, wherein a ratio of contents of component (A) and component (B) is from 80/20 to 50/50 in a mass ratio.

4. The thermosetting resin material according to claim 1, further comprising:

(C) a filler treated with an organic compound.

5. The thermosetting resin material according to claim 4, wherein the filler treated with an organic compound of component (C) is mixed in the reaction process at the time of manufacture of the thermosetting resin of component (A).

* * * * *